(12) United States Patent  (10) Patent No.: US 7,606,599 B2
Wakasa et al.  (45) Date of Patent: Oct. 20, 2009

(54) MOBILE TERMINAL DEVICE (75) Inventors: Tetsushi Wakasa, Kanagawa (JP);
Junichi Hasegawa, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 739 days.

(21) Appl. No.: 11/254,605

(22) Filed: Oct. 19, 2005

(65) Prior Publication Data

US 2006/0084416 A1   Apr. 20, 2006

(30) Foreign Application Priority Data

Oct. 20, 2004   (JP)   ............ P.2004-305710

(51) Int. Cl.
*H04M 1/00*   (2006.01)
(52) U.S. Cl. .................. 455/566; 455/414.1; 455/414.2
(58) Field of Classification Search .............. None
See application file for complete search history.

(56) References Cited

U.S. PATENT DOCUMENTS

| 7,373,109 | B2 * | 5/2008 | Pohja et al. ............ 455/41.2 |
| 2007/0247333 | A1 * | 10/2007 | Borean et al. ............ 340/932.2 |
| 2008/0126986 | A1 * | 5/2008 | Tsukiji ................... 715/810 |

FOREIGN PATENT DOCUMENTS

| JP | 10-078923 | 3/1998 |
| JP | 2001-101098 | 4/2001 |
| JP | 2002111798 A | 4/2002 |
| JP | 2002366485 A | 12/2002 |
| JP | 2003198762 A | 7/2003 |

OTHER PUBLICATIONS

Japanese language office action and its English language translation for corresponding Japanese application 2004305710 lists the references above.

* cited by examiner

*Primary Examiner*—Ajit Patel
(74) *Attorney, Agent, or Firm*—Hogan & Hartson LLP (57) ABSTRACT

A mobile terminal device includes a communication portion, a display plane, a first storage portion, and a control portion which controls to display a standby screen on the display plane during a standby operation of the communication portion. When the communication portion receives a communication message, the control portion controls to store the communication message in the first storage portion, then extracts at least a part of any of sender information, subject information, or text information in the communication message, forms an electronic tag in which a character string based on the extracted information is indicated, and controls the display portion to display the electronic tag on the standby screen.

20 Claims, 11 Drawing Sheets

| Name | E-mail Address | Phone Number | Secret Registration |
|---|---|---|---|
| Taro Yamada | xxx@xx.ne.jp | 090-xxxx-xxxx | ON |
| Jiro Sato | xyy@xx.ne.jp | 090-xyyy-xyyy | OFF |
| Hanako Kyocera | yyy@xx.ne.jp | 090-yyyy-yyyy | OFF |
| Shinnosuke Kyocera | zzz@xx.ne.jp | 090-zzzz-zzzz | OFF |
| ⋮ | ⋮ | ⋮ | ⋮ |

MOBILE TERMINAL DEVICE

CROSS-REFERENCE TO RELATED APPLICATIONS

This application is based upon and claims the benefit of priority from the prior Japanese Patent Applications No. 2004-305710, filed on Oct. 20, 2004, the entire contents of which are incorporated herein by reference.

BACKGROUND OF THE INVENTION

1. Field of the Invention

The present invention relates to a mobile terminal device which informs the user that the mobile terminal device has received a communication message.

2. Description of the Related Art

In the related art, there was the mobile terminal device that is capable of transmitting/receiving the communication message such as the character message in the character message transmitting/receiving service (Short Message Service), or the communication message, when connected to the communication network.

The communication that uses the communication message via such mobile terminal device possess such an adaptability that, even when the receiver cannot read this communication message immediately after he or she received the message, such receiver can read the communication message after a while when convenient. Also, the transmitter of the communication message can transmit the communication message at any time without regard to the schedule of the other party of the communication, and the like in anticipation of such adaptability.

However, because the communication that uses the communication message has such adaptability, actually the receiver sometimes does not read the communication message and leaves such message as it is. For instance, in some cases the receiver did not become aware of the reception when he or she received the communication message, the receiver did not read the communication message, which does not need an emergent handling but is to be read within a predetermined period, within such predetermined period.

Therefore, in order to prevent that the receiver does not become aware of the reception of the communication message, the receiver does not read the message at the appropriate time, the information processing device for keeping temporarily the transmitted communication message, and then forwarding this communication message to the other party of the communication on the date and time designated by the transmitter of this communication message was provided (For example, JP-A-2001-101098).

Also, as the mobile terminal device capable of preventing that the received communication message is not read but left as it is, the mobile terminal device for displaying an icon indicating that the mobile terminal device received the communication message on the display plane of the display portion when the mobile terminal device received the communication message, to cause the user as the receiver to recognize the reception of the communication message without fail was provided.

JP-A-2001-101098 is referred to as a related art.

However, according to the above mobile terminal device, although the icon indicating the reception of the communication message is displayed on the display plane, the user cannot understand the degree of importance and the extent of emergency of the communication message.

For this reason, in order to check the degree of importance and the extent of emergency of the communication message, the user must execute predetermined operations to check the subject or the sender of the communication message, or read the contents thereof, irrespective of whether or not the degree of importance and the extent of emergency of the communication message.

SUMMARY OF THE INVENTION

An object of the present invention is to provide a mobile terminal device that makes it possible for the user to know the degree of importance and the extent of emergency of the communication message, without predetermined operations required to check a subject or a sender of the communication message, or read the contents thereof, when the mobile terminal device received a communication message such as an e-mail.

The invention provides a mobile terminal device, having: a communication portion which is connected to a communication network, and transmits and receives a communication message including sender information and at least one of subject information and text information; a display portion which displays at least characters; a storage portion which stores the communication message; and a control portion which controls contents to be displayed on the display portion, wherein, when the communication portion receives the communication message, the communication message is stored in the storage portion, and the control portion extracts at least a part of any of the sender information, the subject information, or the text information concerning the communication message, forms an electronic tag in which a character string based on the extracted information is indicated and controls the display portion to display the electronic tag.

BRIEF DESCRIPTION OF THE DRAWINGS

The nature of this invention, as well as other objects and advantages thereof, will be explained in the following with reference to the accompanying drawings, in which like reference character designate the same or similar parts throughout the figures and wherein.

DETAILED DESCRIPTION OF THE PREFERRED EMBODIMENTS

An embodiment of a mobile terminal device according to the present invention will be explained concretely with reference to the drawings hereinafter.

FIG. 1 to FIG. 11 are views that are referred to explain a cellular phone 2 according to an embodiment of the present invention.

Figure 1:
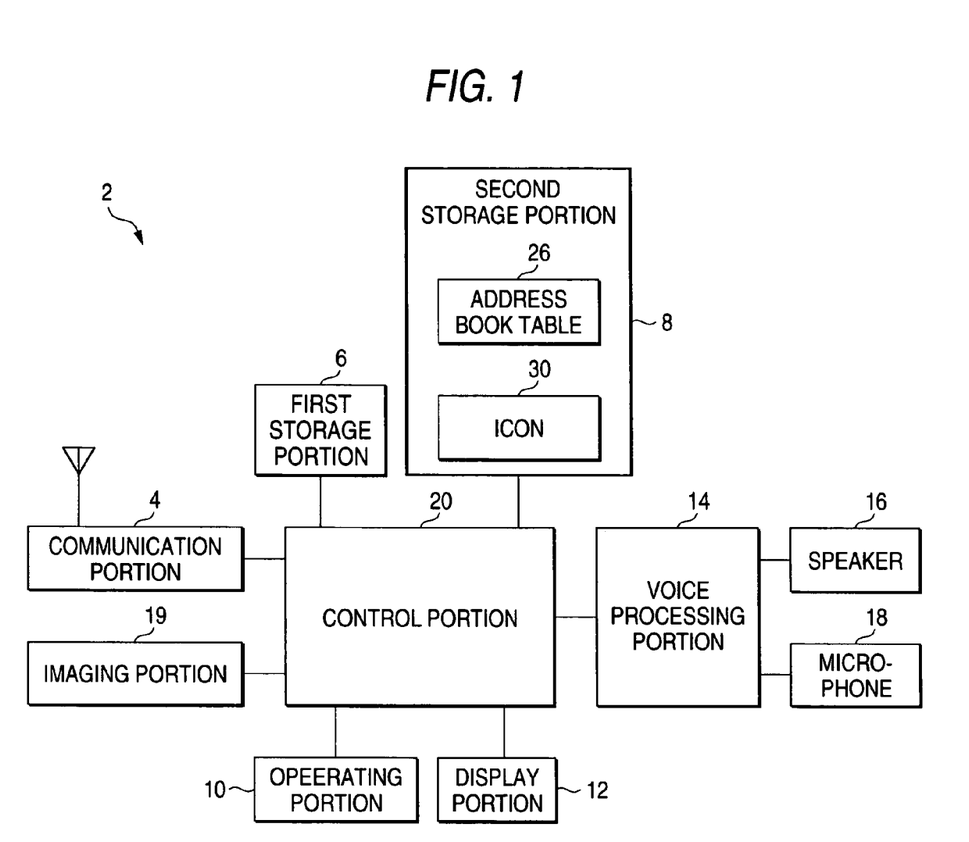
FIG. 1 is a block diagram showing a circuit configuration of a cellular phone 2 according to an embodiment of the present invention.

FIG. 1 is a block diagram showing a circuit configuration of a cellular phone 2 according to the present embodiment. As shown in FIG. 1, the cellular phone 2 includes a communication portion 4, a first storage portion 6, a second storage portion 8, an operating portion 10, a display portion 12, a voice processing portion 14, a speaker 16, a microphone 18, an imaging portion 19, and a control portion 20 for controlling respective portions.

The voice processing portion 14, the speaker 16, and the microphone 18 are used when the telephone conversation is made via the communication portion 4. Respective portions are operated similarly to the normal phone.

Figure 2:
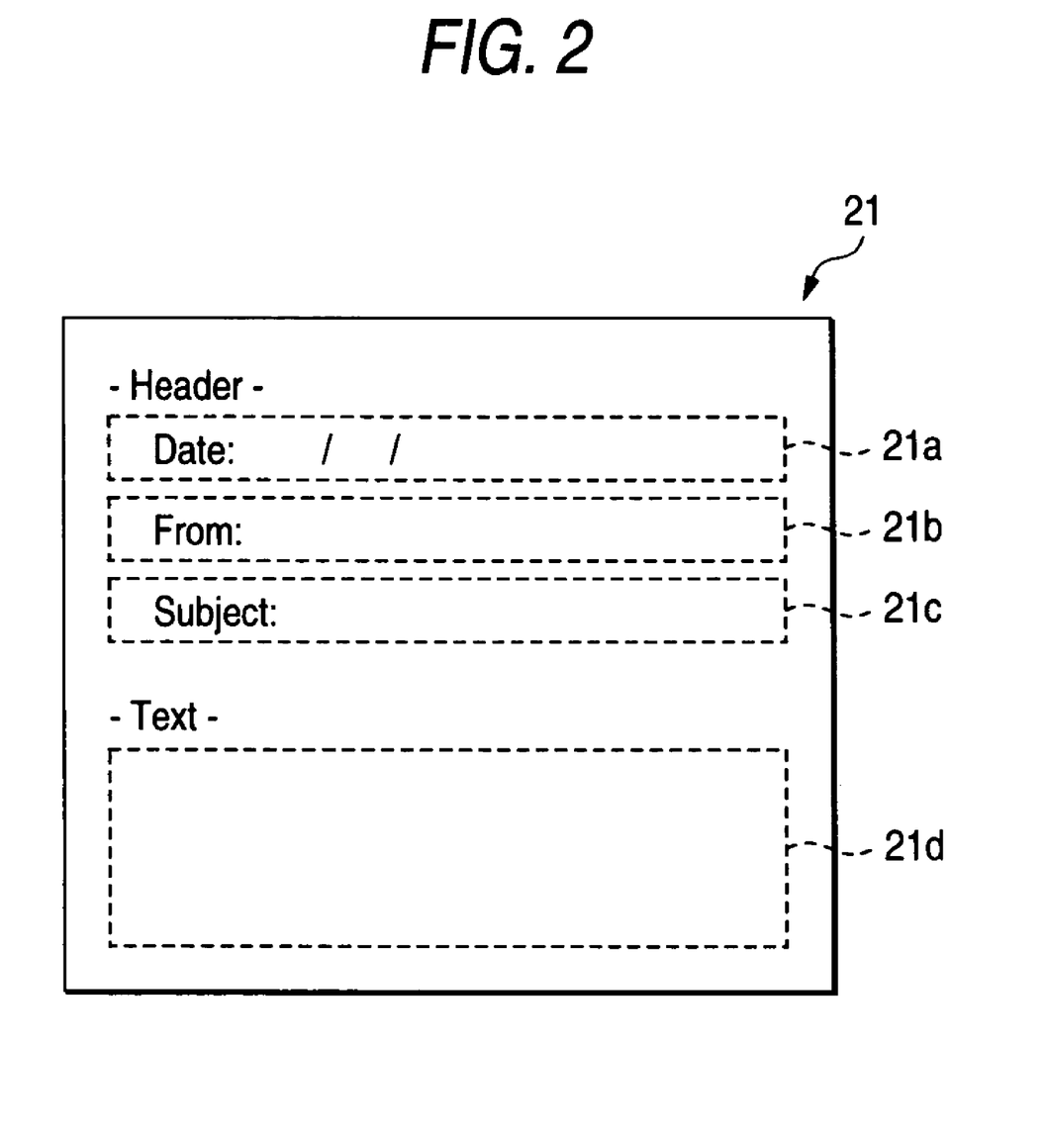
FIG. 2 is a conceptual view showing an e-mail 21 that a communication portion 4 shown in FIG. 1 receives.

The communication portion 4 can be connected to the public communication network from the nearest base station (not shown) via radio communication. Also, as shown in FIG. 2, the communication portion 4 can transmit and receive data of an e-mail 21 in the normal format that includes the sending date 21a, an e-mail address 21b of the sender, a subject 21c, and a text 21d.

Figure 3:
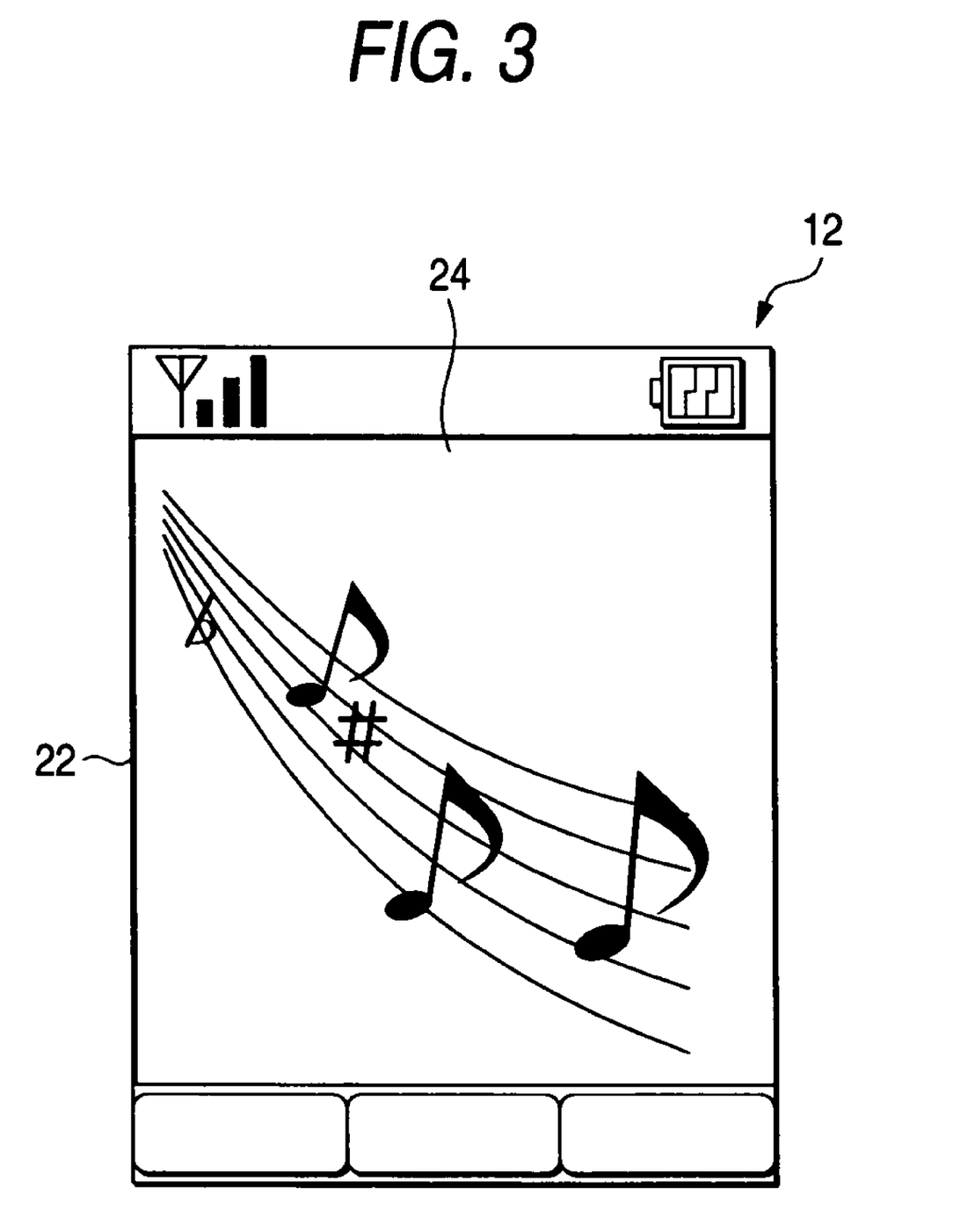
FIG. 3 is a view showing a display plane 22 of a display portion 12 shown in FIG. 1 and a standby screen 24 displayed on the display plane 22.

An LCD (liquid crystal display) is used as the display portion 12 shown in FIG. 1. This display portion 12 displays a standby screen 24 on a display plane 22 based on an instruction from the control portion 20, as shown in FIG. 3, when the communication portion 4 is in the communication standby state. Here, the wording "communication standby state" means the state that the communication portion 4 is neither executing the communication of telephone conversation nor transmitting/receiving an e-mail 21.

Figure 4:
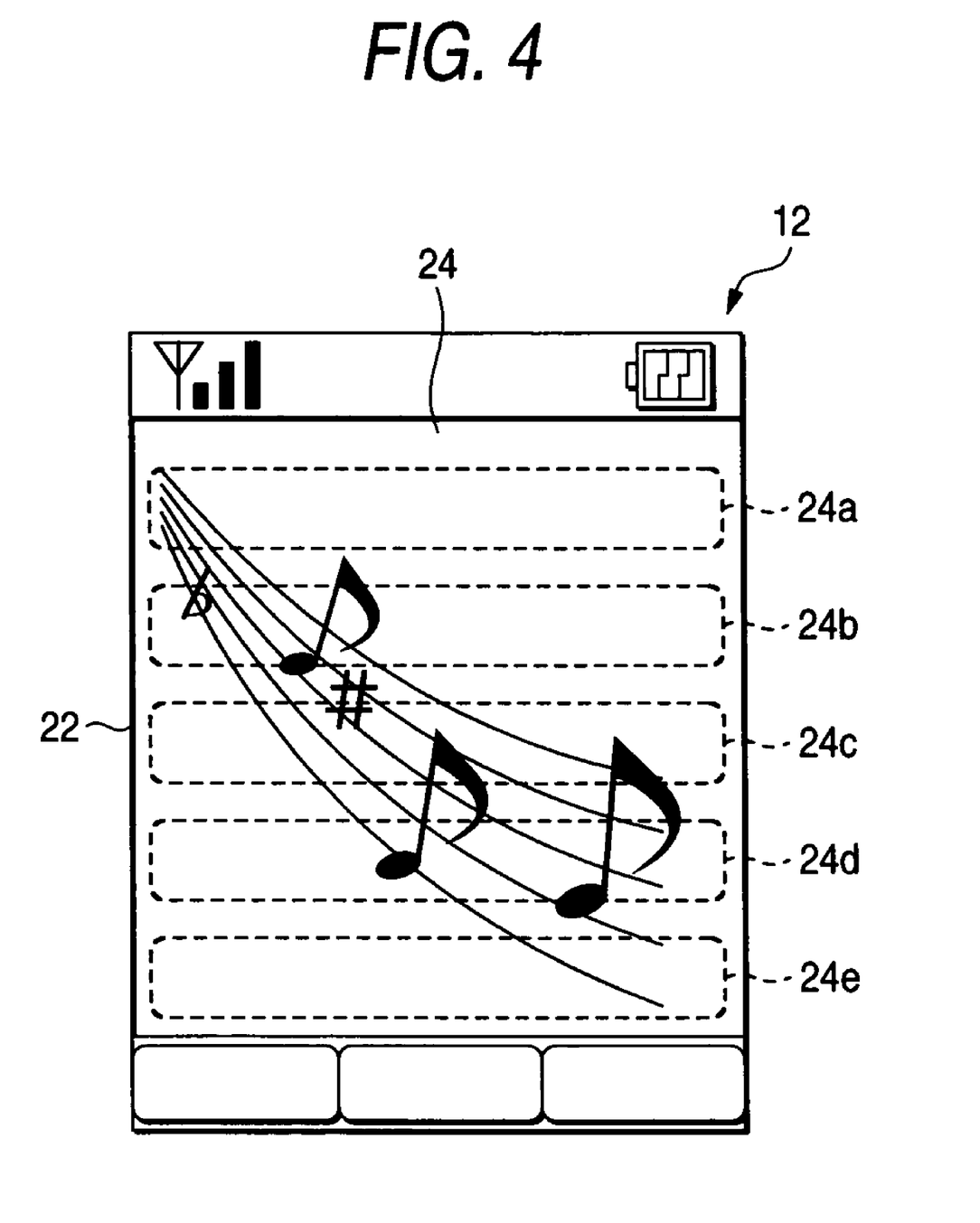
FIG. 4 is a view showing the standby screen 24 shown in FIG. 3 and electronic tag display areas 24a, 24b, 24c, 24d, 24e on this standby screen 24.

An electronic tag 28 described later is displayed on the standby screen 24 of the display plane 22 based on the instruction from the control portion 20 to be superposed on the current screen (see FIG. 8). Five predetermined electronic tag display areas 24a, 24b, 24c, 24d, 24e each shown to be surrounded by a virtual broken line are defined in the display area on the standby screen 24, as shown in FIG. 4. The electronic tag 28 is displayed in the electronic tag display areas 24a, 24b, 24c, 24d, 24e in prepared order from the electronic tag display area 24a side respectively.

Also, the first storage portion 6 shown in FIG. 1 stores the electronic message of the e-mail 21 that the communication portion 4 received, and also store the electronic tag 28, prepared by the control portion 20 based on the received e-mail 21, to be correlated with the original e-mail 21.

Also, when the electronic tag 28 is displayed on the standby screen 24 to be superposed thereon (see FIG. 8), the first storage portion 6 stores the information indicating on which area out of the electronic tag display areas 24a, 24b, 24c, 24d, 24e the electronic tag 28 is displayed, to be correlated with the e-mail 21.

Figure 5:
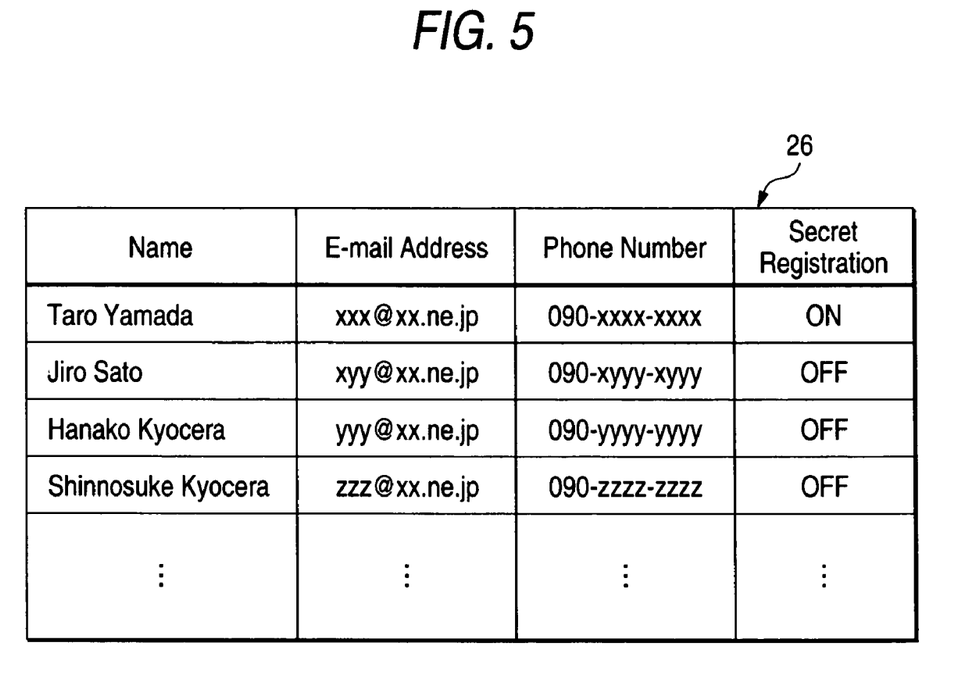
FIG. 5 is a view showing an address book table 26 stored in a second storage portion 8 shown in FIG. 1.

The second storage portion 8 shown in FIG. 1 also stores an address book table 26 shown in FIG. 5. A name, an e-mail address, and a phone number, which are input from the operating portion 10 every subject, are registered on the address book table 26 to be correlated with each other.

For example, it is possible to register the e-mail address only and not to register the registration of the name and the phone number, on the address book table 26.

It is also possible to set a secret registration in order not to form the electronic tag 28 on the address book table 26 every registered e-mail address. In other words, in the case where the user sets the secret registration to an OFF state in response to the degree of importance of the destination, the electronic tag 28 is formed by the processing operation of the control portion 20, described later, when the user receives the e-mail 21 from this destination. In contrast, in the case where the user sets the secret registration to an ON state, the electronic tag 28 is not formed when the user receives the e-mail 21 from this destination. These ON/OFF states are set by the operating portion 10.

The second storage portion 8 shown in FIG. 1 stores any image which corresponds to each e-mail address stored in the address book table 26. The image may be, for example, an image of the person, who has the communication address registered in the address book table 26, picked up by the imaging portion 19.

The second storage portion 8 stores not only the address book table 26 and any image, but also a predetermined icon 30 (see FIG. 8) that does not correspond to any e-mail addresses in the address book table 26. The predetermined icon 30 is previously stored in the second storage portion 8.

Next, a processing operation of the control portion 20 in forming the electronic tag 28 concerning the e-mail 21 when the cellular phone 2 received the e-mail 21 shown in FIG. 2 will be explained based on flowcharts shown in FIG. 6 and FIG. 7 hereunder.

When the communication portion 4 of the cellular phone 2 is in the communication standby state, the standby screen 24 is displayed on the display plane 22, as shown in FIG. 3. Then, when the communication portion 4 shown in FIG. 1 receives the e-mail 21, the control portion 20 controls to store the e-mail 21 in the first storage portion 6.

Figure 6:
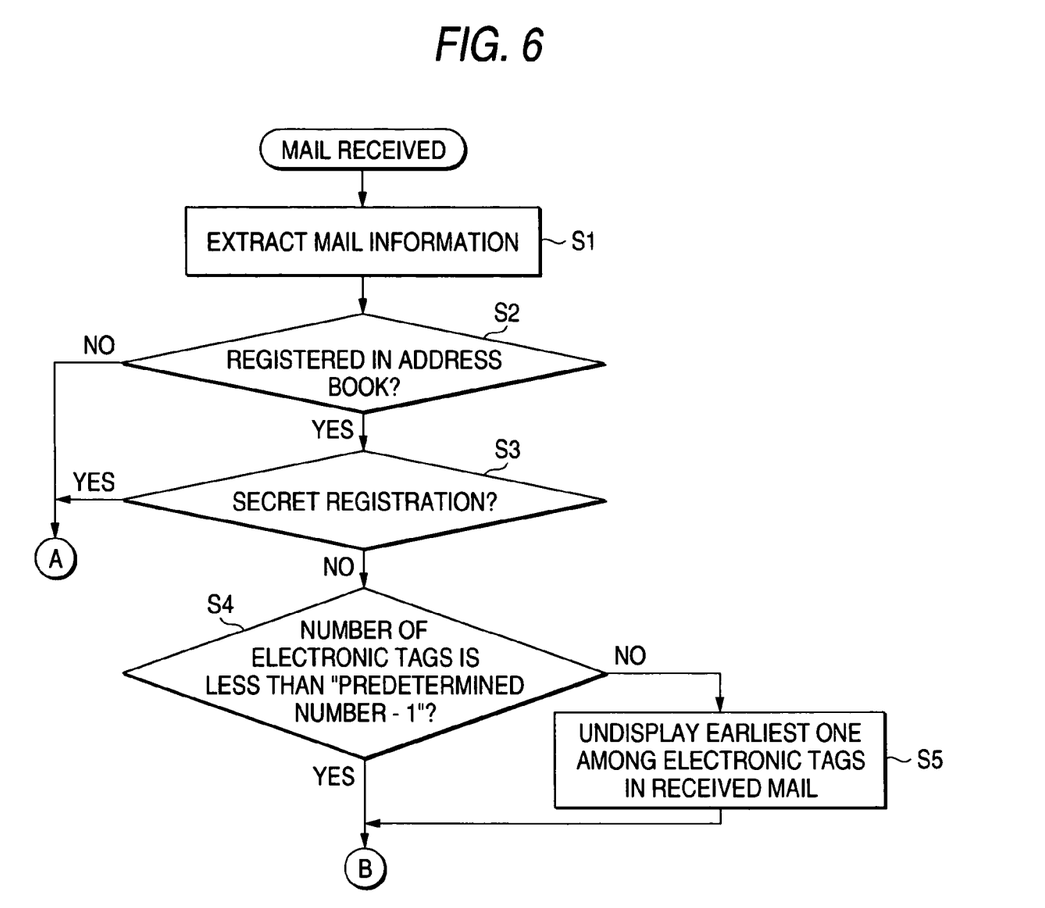
FIG. 6 is a flowchart showing a processing operation of a control portion 20 shown in FIG. 1.

Then, the control portion 20 extracts the sending date 21a, the e-mail address 21b of the sender, the subject 21c, and the text 21d from the received e-mail 21 shown in FIG. 2 respectively (step S1 in FIG. 6). Then, the control portion 20 decides whether or not the e-mail address 21b of the e-mail 21 coincides with any one of the e-mail addresses registered in the address book table 26 shown in FIG. 5 (step S2 in FIG. 6).

If the e-mail address 21b of the e-mail 21 coincides with none of the e-mail addresses registered in the address book table 26 (NO in step S2), the control portion 20 does not form the electronic tag 28. Then, the processing operation is ended (End in FIG. 7).

When the secret registration in the address book table 26 (see FIG. 5) is set to the ON state (YES in step S3 in FIG. 6), the control portion 20 also does not form the electronic tag 28 even though the e-mail address 21b of the e-mail 21 coincides with any one of the e-mail addresses registered in the address book table 26 (YES in step S2). Then, the processing operation is ended (End in FIG. 7).

Then, if the e-mail address 21b of the e-mail 21 coincides with any one of the e-mail addresses registered in the address book table 26 (YES in step S2) and the secret registration in the address book table 26 is set to the OFF state (NO in step S3), the control portion 20 forms the electronic tag 28 after step S4.

Figure 7:
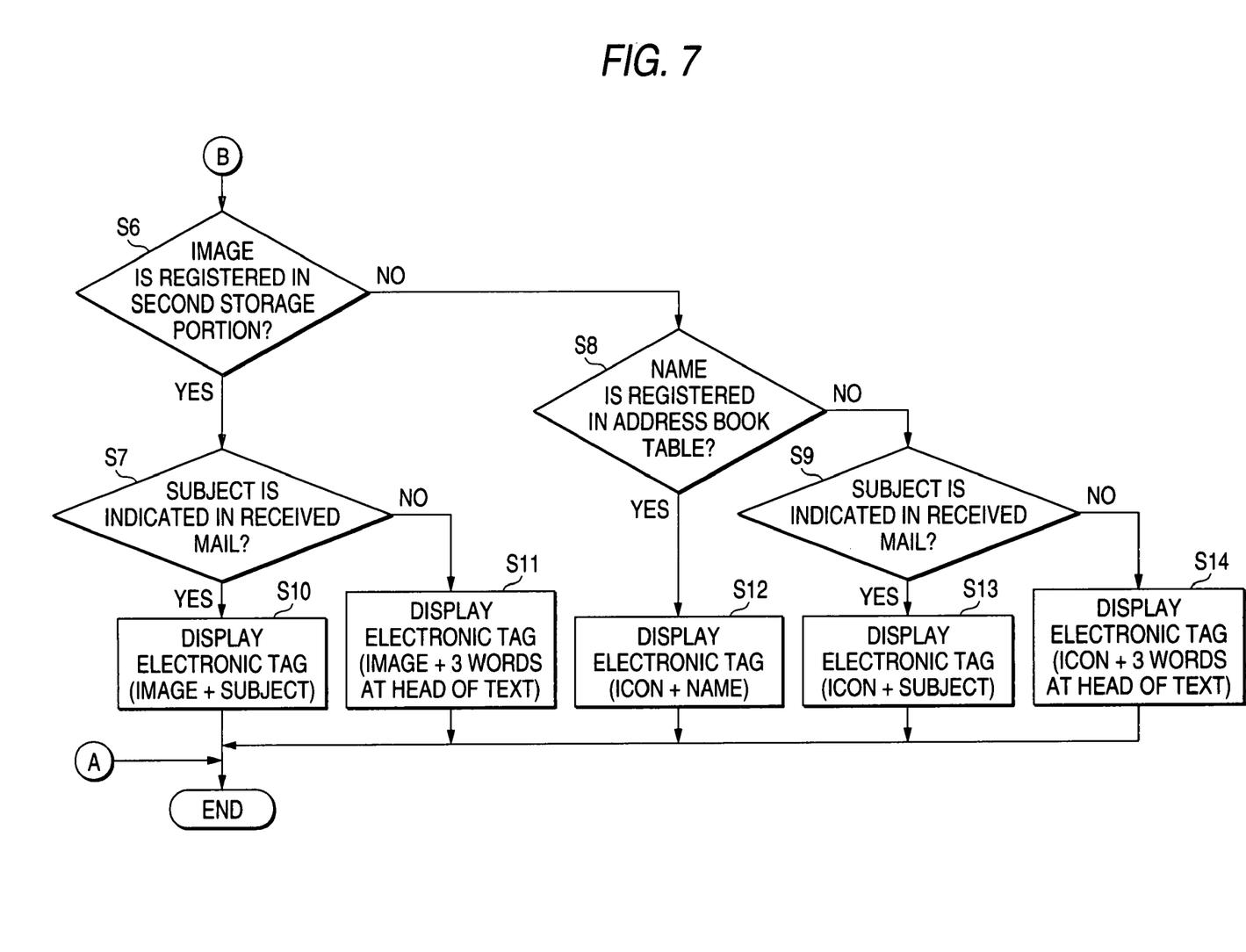
FIG. 7 is a flowchart showing the processing operation of the control portion 20 shown in FIG. 1.

Several electronic tags 28 have been displayed on the standby screen 24 (see FIG. 8) after the processing operation in the flowcharts shown in FIG. 6 and FIG. 7 has already been executed several times. Therefore, in step S4, the control portion 20 decides whether or not the number of electronic tags displayed on the standby screen 24 is less than the number that is smaller than a predetermined number by 1, e.g., 4 or less.

Figure 8:
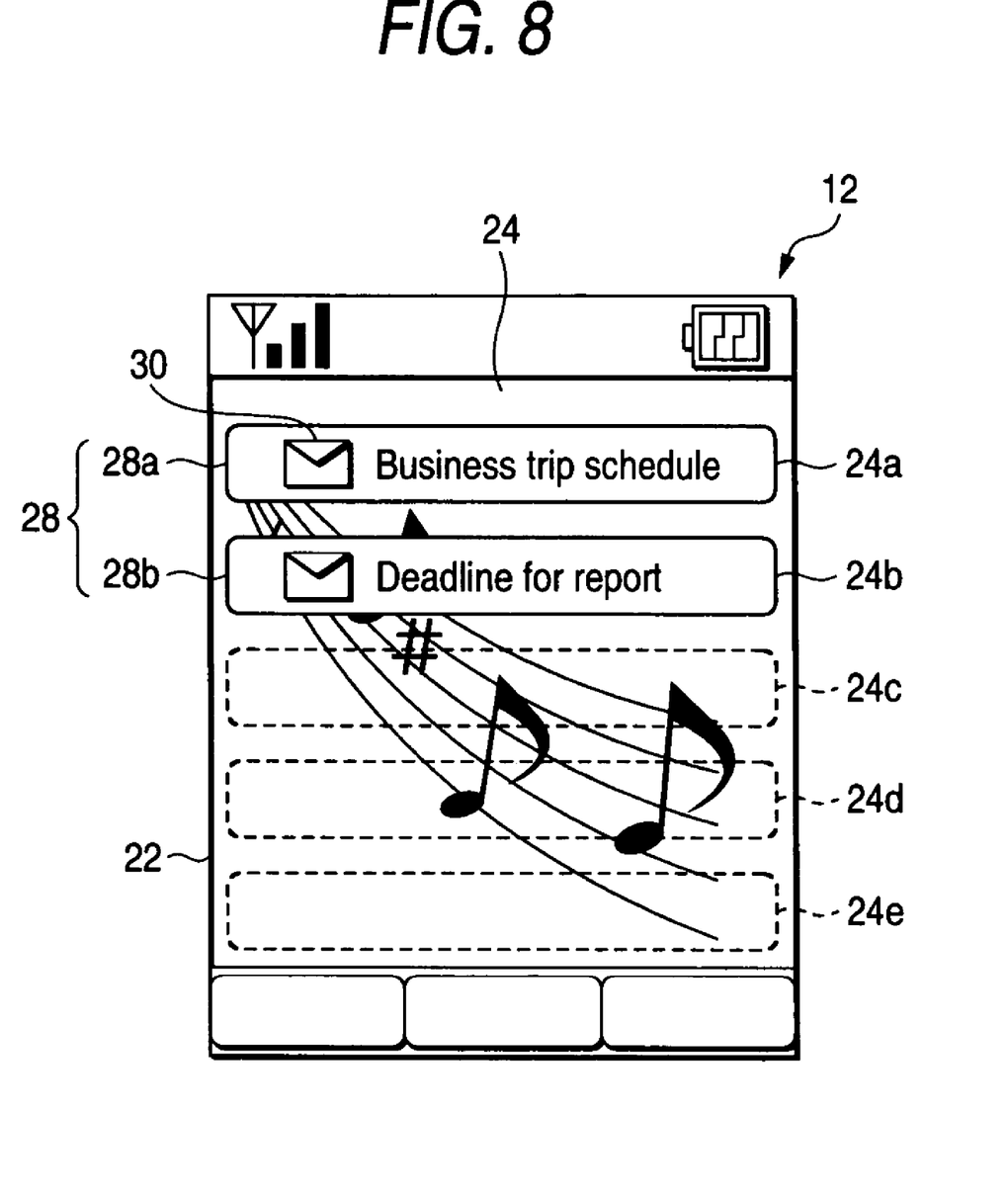
FIG. 8 is a view showing the display plane 22 of the display portion 12 shown in FIG. 1 in a situation that the standby screen 24 and electronic tags 28a, 28b are displayed on this display plane 22.

If the number of electronic tags is less than 4 (YES in step S4), the electronic tag 28 formed at this time is displayed in the area next to the area where the electronic tag 28 formed precedingly is displayed, among the electronic tag display areas 24a, 24b, 24c, 24d, 24e shown in FIG. 8.

If the number of displayed electronic tags 28 already reaches 5 (predetermined number) (NO in step S4), the electronic tag to be displayed subsequently on the standby screen 24 corresponds to the sixth electronic tag. Thus, the number of electronic tags 28 exceeds the predetermined number that can be displayed on the standby screen 24.

Therefore, in step S5, the earliest electronic tag 28 among the electronic tags 28 being displayed on the display plane 22 is undisplayed to keep the space in which the electronic tag 28 formed at this time is displayed. Then, the process proceeds to step S6 after the processing operation in step S5 is completed.

As a result, it is defined which area of the electronic tag display areas 24a, 24b, 24c, 24d, 24e the electronic tag 28 formed at this time should be displayed, just before the processing operation in step S6 is executed. The control portion 20 controls the first storage portion 6 to store the area, where the electronic tag 28 is displayed, so as to correspond to the e-mail 21.

Then, in steps S6 to S9 in FIG. 7, the control portion 20 chooses the contents displayed as the electronic tag 28. Then, in any step of steps S10 to S14, the control portion 20 controls the electronic tag 28 indicating the contents chosen in this way to displays on the standby screen 24.

That is, in step S6, the control portion 20 decides whether or not any image corresponding to the e-mail address in the address book table 26, which coincides with the e-mail address 21b of the e-mail 21, (e.g., photograph of user's face of this e-mail address) is stored in the second storage portion 8.

Then, if such an image is stored in the second storage portion 8 (YES in step S6), the control portion 20 decides whether the particular contents are included in the subject 21c of the e-mail 21 or this subject 21c is still left as a blank space (step S7).

If the particular contents are included in the subject 21c (YES in step S7), any image corresponding to the e-mail address in the address book table 26, which coincides with the e-mail address 21b, and the contents in the subject 21c of the e-mail 21 are displayed as the electronic tag 28 (step S10).

In contrast, if the particular contents are not included in the subject 21c and the subject 21c is still left as a blank space (NO in step S7), any image corresponding to the e-mail address in the address book table 26, which coincides with the e-mail address 21b, and 3 head words of the text 21d of the e-mail 21 are displayed as the electronic tag 28 (step S11).

In step S6, if it is decided that the image corresponding to the e-mail address in the address book table 26, which coincides with the e-mail address 21b of the e-mail 21, is not stored in the second storage portion 8 (NO in step S6), the process proceeds to step S8.

In step S8, the control portion 20 decides whether the name corresponding to the e-mail address in the address book table 26, which coincides with the e-mail address 21b of the e-mail 21, is substantially registered in the address book table 26 or is still left as a blank space.

If the name corresponding to the e-mail address 21b is substantially registered in the address book table 26 (YES in step S8), the predetermined icon 30 (see FIG. 8) stored in the second storage portion 8 and the name (see FIG. 5) in the address book table 26 corresponding to the e-mail address 21b are displayed as the electronic tag 28 (step S12 in FIG. 7).

If the name corresponding to the e-mail address 21b is not registered in the address book table 26 and is still left as a blank space (NO in step S8), it is decided like step S7 whether the particular contents are included in the subject 21c of the e-mail 21 or this subject 21c is still left as a blank space (step S9).

If the particular contents are included in the subject 21c (YES in step S9), the predetermined icon 30 stored in the second storage portion 8 and the contents of the subject 21c of the e-mail 21 are displayed as the electronic tag 28 (step S13).

In contrast, if the particular contents are not included in the subject 21c and the subject 21c is still left as a blank space (NO in step S9), the predetermined icon 30 stored in the second storage portion 8 and also 3 head words of the text 21d of the e-mail 21 are displayed as the electronic tag 28 (step S14).

FIG. 8 is a view showing a situation that the electronic tag 28 prepared based on the flowcharts in FIG. 6 and FIG. 7 is displayed on the standby screen 24 to be superposed on the current screen.

In the electronic tags, the electronic tag displayed in the electronic tag display area 24a of the standby screen 24 is designated by a reference numeral 28a, and the electronic tag displayed in the electronic tag display area 24b is designated by a reference numeral 28b. The electronic tag 28a and the electronic tag 28b are prepared in response to mutually different e-mails 21.

The electronic tag 28a is displayed by the processing operation in step S13 in the flowcharts in FIG. 6 and FIG. 6. As shown in FIG. 8, the predetermined icon 30 and the description "Business trip scheduled" as the subject 21b of the received e-mail 21 are displayed.

The electronic tag 28b is displayed by the processing operation in step S14. The predetermined icon 30 and the description "Deadline for report" as 3 head words of the text 21d of the received e-mail 21 are displayed.

Figure 9:
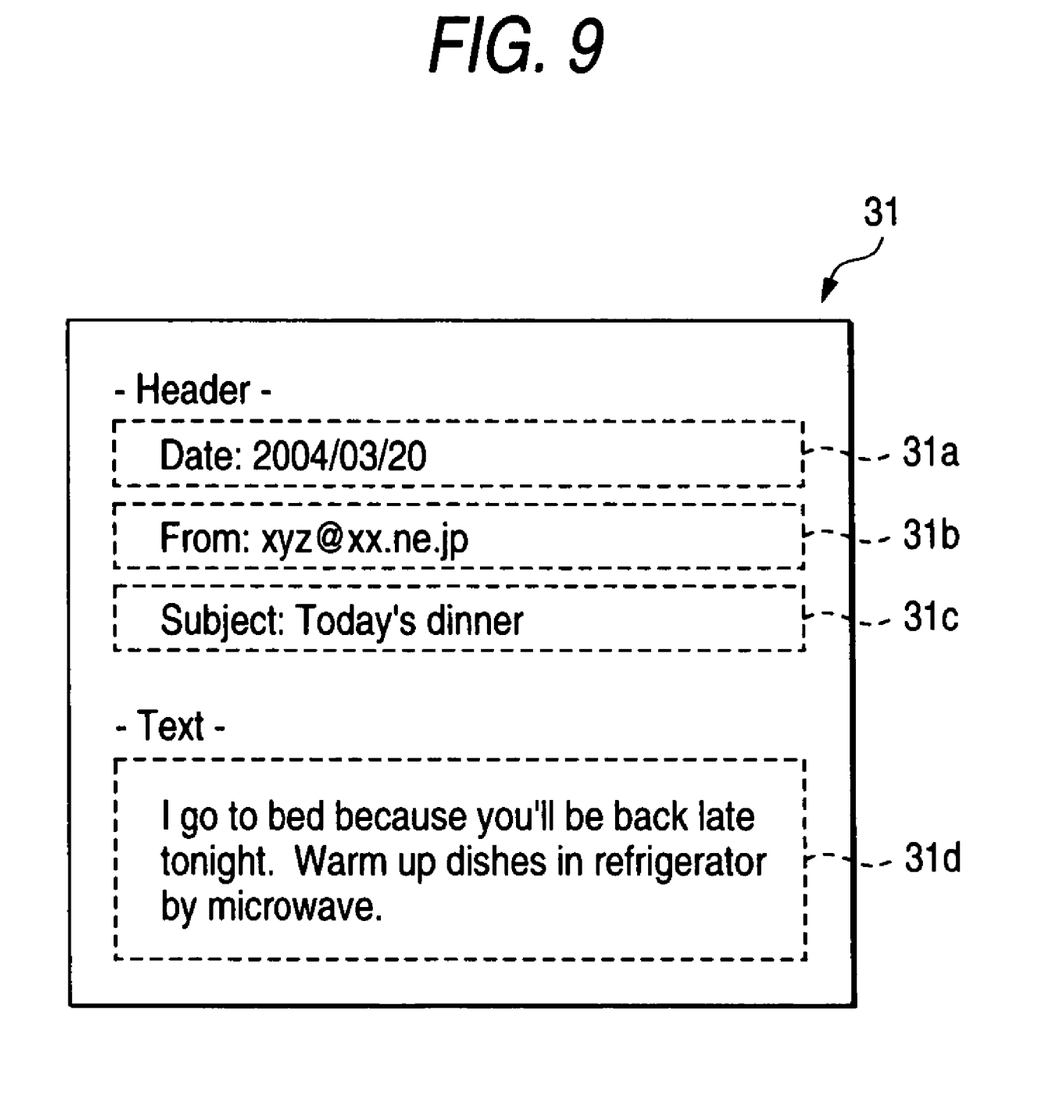
FIG. 9 is a conceptual view showing a particular e-mail 31 prepared in compliance with a format of the e-mail 21 shown in FIG. 2.

Next, the case where an e-mail 31 having the contents shown in FIG. 9 is newly received in a situation that the electronic tags 28a, 28b are displayed on the standby screen 24 being displayed on the display plane 22 of the cellular phone 2, as shown in FIG. 8, will be explained hereunder.

The e-mail 31 shown in FIG. 9 is prepared in the same format as the e-mail 21 shown in FIG. 2. A sending date 31a, an e-mail address 31b of the sender, a subject 31c, and the contents of a text 31d are exemplified particularly.

Figure 10:
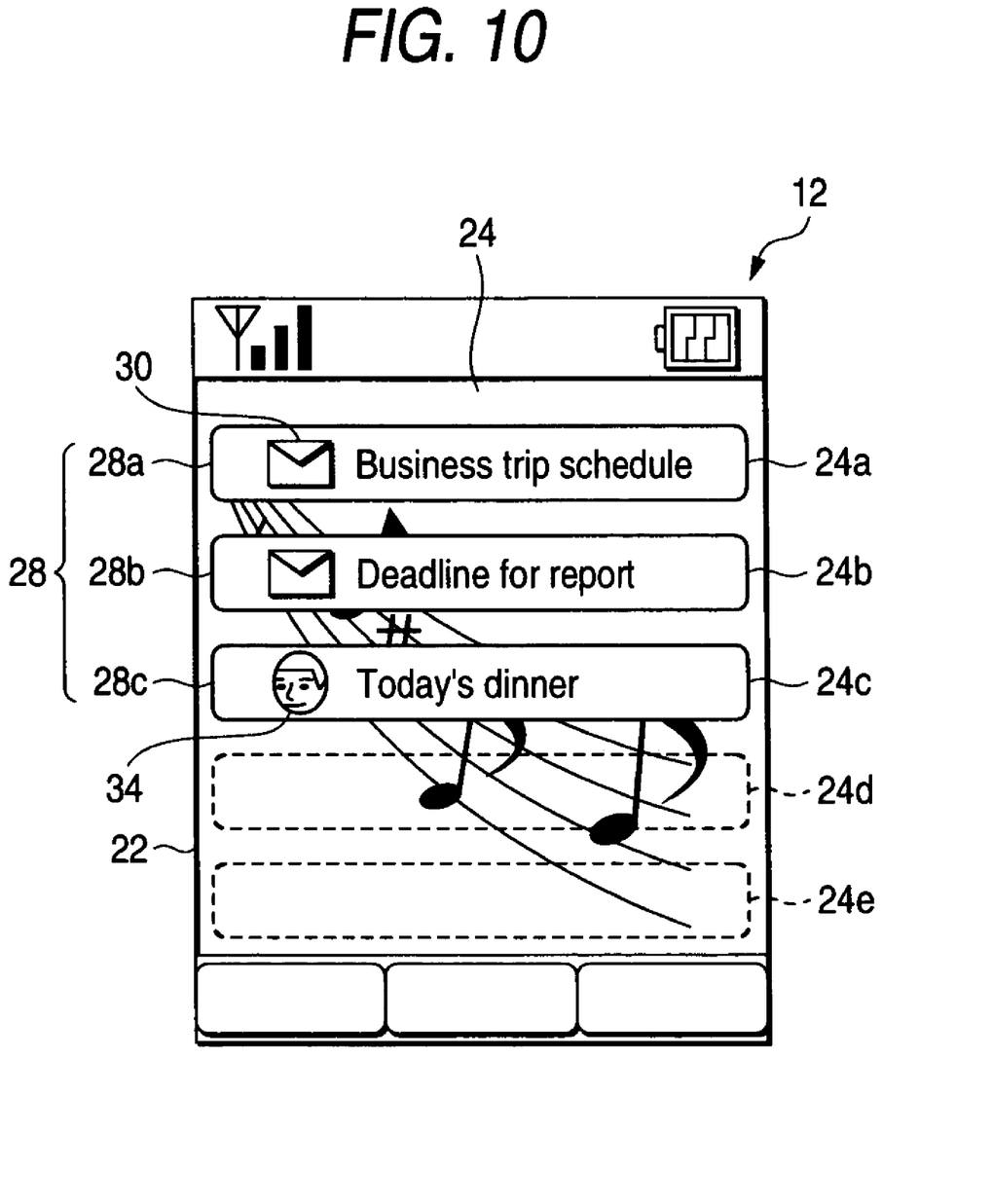
FIG. 10 is a view showing the display plane 22 of the display portion 12 shown in FIG. 1 in a situation that the standby screen 24 and electronic tags 28a, 28b, 28c are displayed on this display plane 22.

When the cellular phone 2 receives such e-mail 31, the cellular phone 2 displays an electronic tag 28c in the electronic tag display area 24c on the standby screen 24, as shown in FIG. 10, by the processing operation of the control portion 20 shown in the flowcharts of FIG. 6 and FIG. 7.

This electronic tag 28c is displayed by the processing operation in step S10 in the flowcharts of FIG. 6 and FIG. 7. An image 34 of the sender who sent the e-mail 31 and the description "Today's dinner" as the subject 31c of the e-mail 31 are displayed.

As the assumption required to display the image 34 of the sender of the e-mail 31 and the subject 31c as the electronic tag 28c, it is needless to say that the cellular phone 2 is set in such a situation that the e-mail address coinciding with the e-mail address 31b of the e-mail 31 has already been registered in the address book table 26 shown in FIG. 5 and the image 34 corresponding to this e-mail address has been stored in the second storage portion 8. It is also needless to say that the secret registration in the address book table 26, which corresponds to this e-mail address, has been set to the OFF state.

Figure 11:
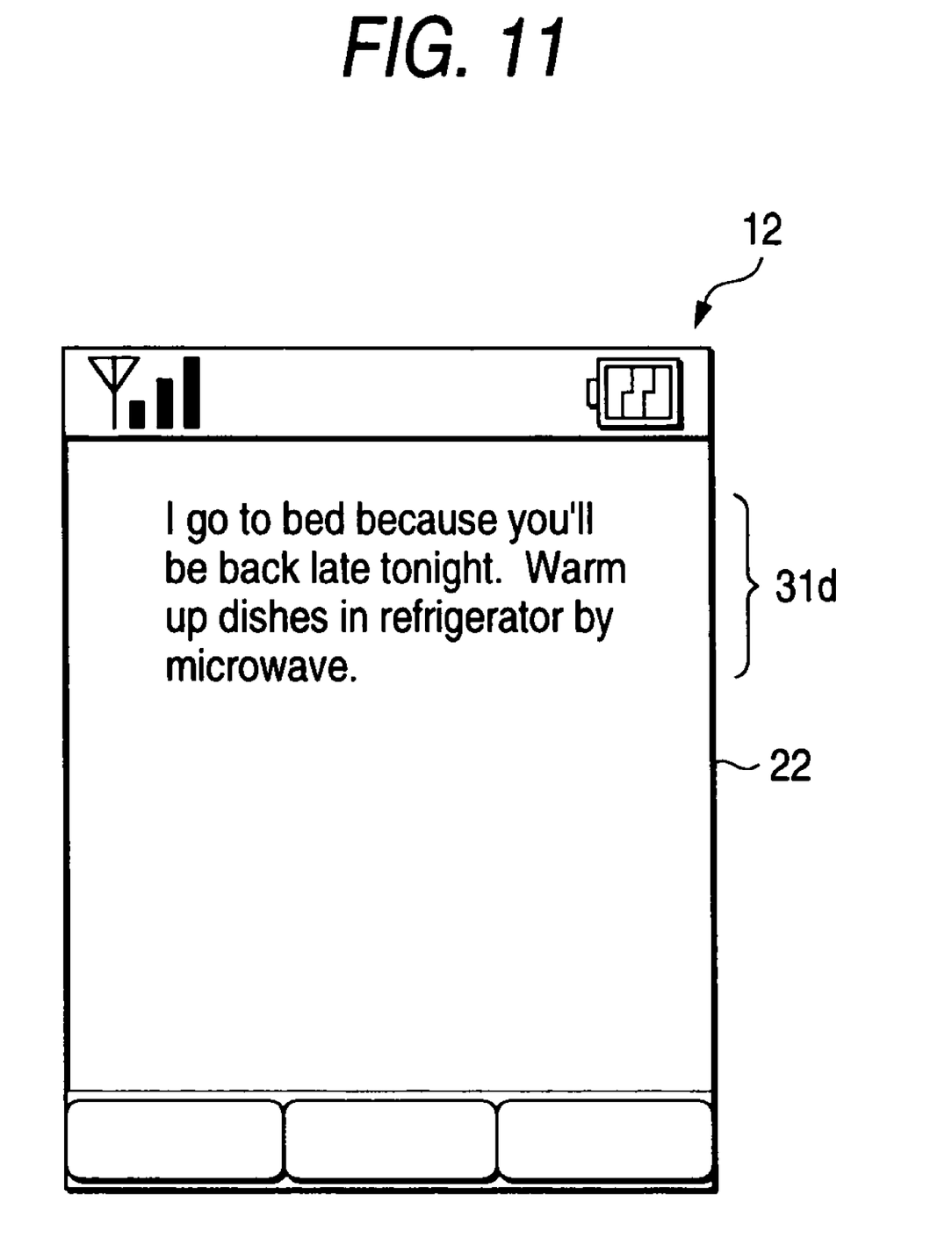
FIG. 11 is a view showing the display plane 22 of the display portion 12 shown in FIG. 1 in a situation that a text 31d of the e-mail 31 is displayed on this display plane 22.

The cellular phone 2 is set in such a situation that, when the operation to appoint the electronic tag 28c is carried out by moving a cursor, by using an up/down key, a decision key (not shown) provided to the operating portion 10 under the condition that the electronic tags 28a, 28b, 28c are displayed on the display plane 22 as shown in FIG. 10, for example, the control portion 20 instructs the display portion 12 to display the text 31d of the e-mail 31 corresponding to the electronic tag 28c on the display plane 22, as shown in FIG. 11.

When the text 31d of the e-mail 31 corresponding to such electronic tag 28c is displayed on the display plane 22, the control portion 20 controls the electronic tag 28c to be undisplayed from this display plane 22 because the role of this tag has come to an end.

Therefore, when the predetermined operation is executed to display the standby screen 24 on the display plane 22 in a situation that the text 31d of the e-mail 31 corresponding to the electronic tag 28c is being displayed on the display plane 22, only the standby screen 24 and the electronic tags 28a, 28b are displayed on the display plane 22, as shown in FIG. 8, but the electronic tag 28c is not displayed.

As shown in FIG. 11, when a hook-off key (not shown) provided to the operating portion 10 is pushed in a situation that the text 31d of the e-mail 31 is being displayed on the display plane 22, the control portion 20 controls the communication portion 4 to execute the calling operation of telephone conversation to the sender of the e-mail 31 by looking up the phone number in the address book table 26 shown in FIG. 5.

As shown in FIG. 11, when a mail key (not shown) provided to the operating portion 10 is pushed in a situation that the text 31d is being displayed on the display plane 22, the control portion 20 controls the display portion 12 to display an editing screen, although not shown, used to form a reply e-mail on the display plane 22 instead of the text 31d.

According to the cellular phone 2 of the embodiment, after such cellular phone 2 receives the e-mail 21, the electronic tags 28 are displayed on the standby screen 24. Therefore, the user can know the degree of importance and the extent of emergency of the e-mail 21 corresponding to the electronic tag 28 without the predetermined operation required to check the subject 21c of the e-mail 21 or the e-mail address 21b of the sender, or read the contents of the text 21d.

The electronic tags 28 are displayed in the predetermined electronic tag display areas 24a, 24b, 24c, 24d, 24e on the standby screen 24. Therefore, the user can find at once these electronic tags 28.

When the user looks at the electronic tag 28 displayed on the display plane 22 and then decides that the e-mail 21 corresponding to this electronic tag 28 is important, the user can display simply the text 21d of the e-mail 21 corresponding to this electronic tag 28 on the display plane 22 by executing the operation to appoint this electronic tag 28.

When the text 21d of the e-mail 21 corresponding to this electronic tag 28 is displayed on the display plane 22 based on the operation that appoints the electronic tag 28 displayed on the display plane 22, this electronic tag 28 is undisplayed. Therefore, when the standby screen 24 is displayed once again, the user can easily know whether or not the important e-mail 21 that the user has not read yet is present.

In the embodiment, only if the e-mail address 21b of the sender of the received e-mail 21 coincides with any one of the e-mail addresses registered in the address book table 26 shown in FIG. 5 (YES in step S2) in step S2 in the flowcharts in FIG. 6 and FIG. 7, the electronic tag 28 is formed. However, as another embodiment different from the present embodiment, when the e-mail address 21b coincides with none of the e-mail addresses registered in the address book table 26, the electronic tag 28 may be formed.

In such case, when the electronic tag 28 corresponding to the e-mail 21, in which the e-mail address 21b of which coincides with none of the e-mail addresses registered in the address book table 26, is to be displayed, another icon (equivalent to the predetermined image) different from the icon 30 may be displayed, as in the case where the icon 30 (see FIG. 8) is displayed in the electronic tag 28 in the present embodiment.

Step S2 and step S3 in the flowcharts in FIG. 6 and FIG. 7 may be omitted. Thus, the electronic tag 28 may be generated to all the received e-mails 21 by executing the processing operation in step S10 or step S14.

In the embodiment, since the standby screen 24 has five electronic tag display areas 24a, 24b, 24c, 24d, 24e, the electronic tag 28 formed based on the newly received e-mail 21 is displayed together with the electronic tags 28 corresponding to other e-mails 21 that were received before this new e-mail is received. In this case, instead of the processing operations in step S4 and step S5 in the flowcharts in FIG. 6 and FIG. 7, the electronic tags 28 corresponding to other e-mails 21 that were received before the new e-mail 21 is received may be undisplayed from the standby screen 24.

In such case, the standby screen 24 may have only one electronic tag display area that is used to display the electronic tag 28.

In the embodiment, the standby screen 24 is constructed to have five electronic tag display areas 24a, 24b, 24c, 24d, 24e. In this case, the standby screen 24 may have one electronic tag display area or six electronic tag display areas or more.

In the embodiment, the electronic tag 28 is prepared only for the received e-mail 21 and then displayed on the display plane 22. In this case, the electronic tag 28 may be prepared for the transmitted e-mail or the character information except the e-mail and then displayed on the display plane 22.

In such case, the electronic tag 28 corresponding to the received e-mail 21 and other electronic tags 28 except this electronic tag are mixedly displayed on the standby screen 24. Therefore, the control portion 20 may restrict the number of the electronic tags 28 corresponding to the received e-mails 21 within the predetermined number in such a manner that the electronic tag display areas used to display other electronic tags 28 other than the electronic tag 28 corresponding to the received e-mail 21 can be kept previously.

As the cellular phone 2 according to the present embodiment, the example in which the first storage portion 6 and the second storage portion 8 are provided separately, as shown in FIG. 1, is explained. As another embodiment different from the present embodiment, a single storage portion in which the first storage portion 6 and the second storage portion 8 are provided collectively may be provided.

As the cellular phone 2 according to the present embodiment, the example in which 3 head words of the text of the e-mail are displayed as the electronic tag is explained. As another embodiment different from the present embodiment, the head portion of the text is displayed as the electronic tag.

In the embodiment, the case where the present invention is applied to the cellular phone 2 is explained. But it is needless to say that the present invention can be applied to other mobile terminal devices except the cellular phone such as Personal Handy phone System that can transmit and receive the communication message such as the e-mail, PDA (Personal Digital Assistant) having a communication function, the notebook computer.

What is claimed is:

1. A mobile terminal device, comprising:
   a communication portion which is connected to a communication network, and transmits and receives a communication message including sender information and at least one of subject information and text information;
   a display portion which displays at least characters;
   a storage portion which stores the communication message; and
   a control portion which controls contents to be displayed on the display portion,
   wherein, when the communication portion receives the communication message,
   the communication message is stored in the storage portion, and
   the control portion extracts at least a part of any of the sender information, the subject information, or the text information concerning the communication message, forms an electronic tag in which a character string based on the extracted information is indicated and controls the display portion to display the electronic tag on a standby screen that is displayed on the display portion during a standby operation of the communication portion.

2. The mobile terminal device according to claim 1, wherein, when the communication portion receives the communication message, the control portion correlates the communication message to be stored in the storage portion with the formed electronic tag.

3. The mobile terminal device according to claim 2, wherein, when an operation to appoint the electronic tag being displayed on the display portion is executed, the control portion controls the display portion to display the communication message that is correlated with the appointed electronic tag and is stored in the storage portion.

4. The mobile terminal device according to claim 3, wherein, when the communication message correlated with the electronic tag is displayed on the display portion, the control portion controls the electronic tag to be undisplayed on the display portion.

5. The mobile terminal device according to claim 2, wherein, when the communication portion receives a new communication message, the control portion controls the electronic tag, which is correlated with another communication message received before the new communication message is received, to be undisplayed on the display portion.

6. The mobile terminal device according to claim 1, wherein the display portion has a plurality of electronic tag display areas in a display area of the display portion.

7. The mobile terminal device according to claim 6, wherein, when the communication portion receives the communication message, the control portion correlates the communication message with any one of the plurality of the electronic tag display areas, and controls the display portion to display the formed electronic tag in the correlated electronic tag display area.

8. The mobile terminal device according to claim 6, wherein the control portion restricts the number of electronic tags displayed on the display portion.

9. A mobile terminal device comprising:
   a communication portion which is connected to a communication network, and transmits and receives a communication message including sender information and at least one of subject information and text information; a display portion which displays at least characters a storage portion which stores the communication message; and a control portion which controls contents to be displayed on the display portion, wherein the storage portion has a communication address storage portion storing a communication address,
   and wherein, when the communication portion receives the communication message, the communication message is stored in the storage portion, and wherein, when the communication message received by the communication portion is transmitted from a communication address stored in the communication address storage portion, the control portion extracts at least a part of any of the sender information, the subject information, or the text information concerning the communication message, forms an electronic tag in which a character string based on the extracted information is indicated and controls the display portion to display the electronic tag, wherein when the communication message received by the communication portion is transmitted from a communication address not stored in the communication address storage portion, the control portion does not form the electronic tag.

10. The mobile terminal device according to claim 9, wherein the communication address storage portion stores the communication address and a name correlated with the communication address, and when the sender information of the communication message received by the communication portion coincides with the communication address stored in the communication address storage portion, the control portion includes the name correlated with the communication address in the electronic tag.

11. The mobile terminal device according to claim 9, wherein the communication address storage portion stores the communication address and an image correlated with the communication address, and when the sender information of the communication message received by the communication portion coincides with the communication address stored in the communication address storage portion, the control portion controls the display portion to display the image correlated with the communication address as the electronic tag.

12. The mobile terminal device according to claim 9, wherein, when the sender information of the communication message received by the communication portion does not coincide with the communication address stored in the communication address storage portion, the control portion controls the display portion to display a predetermined image as the electronic tag.

13. A mobile terminal device according to claim 9,
   wherein the communication address storage portion stores the communication address and a display instruction whether or not the electronic tag is displayed on the display portion when the communication message transmitted from the communication address is received, and
   even if the sender information of the communication message received by the communication portion coincides with the communication address stored in the communication address storage portion, the control portion controls the display portion not to display the electronic tag corresponding to the communication message when the display instruction is set not to display the electronic tag corresponding to the communication message transmitted from the communication address.

14. The mobile terminal device according to claim 7, wherein, when the communication portion receives a new communication message, and the electronic tags correlated with other communication messages are displayed in all electronic tag display areas, the control portion controls an electronic tag, which is correlated with an earliest communication message among the other communication messages, to be undisplayed.

15. The mobile terminal device according to claim 1, wherein, when the subject information is included in the communication message received by the communication portion, the control portion indicates the subject information in the electronic tag.

16. The mobile terminal device according to claim 1, wherein, when the text information included in the communication message is indicated in the electronic tag, the control portion indicates a head portion of the text information.

17. The mobile terminal device according to claim 7, wherein, when an operation to appoint any one of the plurality of the electronic tag display areas is executed and the appointed electronic tag display area corresponds to an electronic tag display area correlated with the communication message, the control portion controls the display portion to display the communication message.

18. A mobile terminal device, comprising:
- a communication portion which is connected to a communication network, and transmits and receives a communication message including sender information and at least one of subject information and text information;
- a display portion which displays at least characters;
- a storage portion which stores the communication message; and
- a control portion which controls contents to be displayed on the display portion,
- wherein, when the communication portion receives the communication message,
- the communication message is stored in the storage portion, and
- the control portion extracts at least a part of any of the sender information, the subject information, or the text information concerning the communication message, forms an electronic tag in which a character string based on the extracted information is indicated, correlates the communication message to be stored in the storage portion with the formed electronic tag and controls the display portion to display the electronic tag,
- and wherein, when an operation to appoint the electronic tag being displayed on the display portion is executed, the control portion controls the display portion to display the communication message that is correlated with the appointed electronic tag and is stored in the storage portion.

19. The mobile terminal device according to claim 18, wherein, when the communication message correlated with the electronic tag is displayed on the display portion, the control portion controls the electronic tag to be undisplayed on the display portion.

20. A mobile terminal device, comprising:
- a communication portion which is connected to a communication network, and transmits and receives a communication message including sender information and at least one of subject information and text information;
- a display portion which displays at least characters;
- a storage portion which stores the communication message; and
- a control portion which controls contents to be displayed on the display portion,
- wherein, when the communication portion receives the communication message,
- the communication message is stored in the storage portion, and
- the control portion extracts at least a part of any of the sender information, the subject information, or the text information concerning the communication message, forms an electronic tag in which a character string based on the extracted information is indicated, correlates the communication message to be stored in the storage portion with the formed electronic tag and controls the display portion to display the electronic tag,
- and wherein, when the communication portion receives a new communication message, the control portion controls the electronic tag, which is correlated with another communication message received before the new communication message is received, to be undisplayed on the display portion.

* * * * *